(12) United States Patent
Yang et al.

(10) Patent No.: US 7,045,478 B2
(45) Date of Patent: May 16, 2006

(54) METHOD OF PRODUCING A CATALYST FOR ETHYLENE HOMO-AND CO-POLYMERIZATION

(75) Inventors: Chun Byung Yang, Taejeon-shi (KR); Sang Yull Kim, Sungnam-shi (KR); Ho Yeoun Kim, Taejon-shi (KR); Eun Ha Kim, Taejon-shi (KR)

(73) Assignee: Samsung General Chemicals Co., Ltd., Chungnam Province (KR)

( * ) Notice: Subject to any disclaimer, the term of this patent is extended or adjusted under 35 U.S.C. 154(b) by 0 days.

(21) Appl. No.: 10/886,066

(22) Filed: Jul. 7, 2004

(65) Prior Publication Data

US 2004/0242409 A1  Dec. 2, 2004

Related U.S. Application Data

(63) Continuation of application No. 09/980,505, filed as application No. PCT/KR99/00638 on Oct. 23, 1999, now abandoned.

(30) Foreign Application Priority Data

May 27, 1999 (KR) ............... 1999-19193

(51) Int. Cl.
*B01J 31/00* (2006.01)
*B01J 37/00* (2006.01)
*C08F 4/60* (2006.01)
*C08F 4/02* (2006.01)

(52) U.S. Cl. .............. 502/103; 502/104; 502/118; 526/119

(58) Field of Classification Search ............... 526/119; 502/118, 104, 103
See application file for complete search history.

(56) References Cited

U.S. PATENT DOCUMENTS

| | | | |
|---|---|---|---|
| 3,878,124 A | 4/1975 | Durand et al. | |
| 4,069,169 A | 1/1978 | Toyoda et al. | |
| 4,071,672 A | 1/1978 | Kashiwa | |
| 4,071,674 A | 1/1978 | Kashiwa et al. | |
| 4,076,924 A | 2/1978 | Toyota et al. | |
| 4,085,276 A | 4/1978 | Toyota et al. | |
| 4,107,413 A | 8/1978 | Giannini et al. | |
| 4,107,414 A | 8/1978 | Giannini et al. | |
| 4,156,063 A | 5/1979 | Giannini et al. | |
| 4,157,435 A | 6/1979 | Toyota et al. | |
| 4,187,196 A | 2/1980 | Giannini et al. | |
| 4,220,554 A | 9/1980 | Scatá et al. | |
| 4,226,963 A | 10/1980 | Giannini et al. | |
| 4,235,747 A | 11/1980 | Leung | |
| 4,315,835 A | 2/1982 | Scatá et al. | |
| 4,315,874 A | 2/1982 | Ushida et al. | |
| 4,330,649 A | 5/1982 | Kioka et al. | |
| 4,336,360 A | 6/1982 | Giannini et al. | |
| 4,355,143 A | 10/1982 | Lassalle et al. | |
| 4,390,671 A | 6/1983 | Imai et al. | |
| 4,399,054 A | 8/1983 | Ferraris et al. | |
| 4,401,589 A | 8/1983 | Kioka et al. | |
| 4,417,019 A | 11/1983 | Yamamoto et al. | |
| 4,439,540 A | 3/1984 | Cecchin et al. | |
| 4,477,639 A | 10/1984 | Nielsen | |
| 4,518,706 A | 5/1985 | Gessell | |
| 4,613,655 A | 9/1986 | Longi et al. | |
| 4,615,831 A | 10/1986 | Kanno et al. | |
| 4,673,719 A | 6/1987 | Kioka et al. | |
| 4,729,854 A | 3/1988 | Miyata et al. | |
| 4,806,433 A | 2/1989 | Sasaki et al. | |
| 4,816,433 A | 3/1989 | Terano et al. | |
| 4,829,037 A | 5/1989 | Terano et al. | |
| 4,843,049 A | 6/1989 | Invernizzi et al. | |
| 4,847,227 A | 7/1989 | Murai et al. | |
| 4,847,639 A | 7/1989 | Sugata et al. | |
| 4,866,022 A | 9/1989 | Arzoumanidis et al. | |
| 4,912,074 A | 3/1990 | Miro | |
| 4,946,816 A | 8/1990 | Cohen et al. | |
| 4,952,649 A | 8/1990 | Kioka et al. | |
| 4,962,167 A | 10/1990 | Shiraishi et al. | |
| 4,970,186 A | 11/1990 | Terano et al. | |
| 4,978,648 A | 12/1990 | Barbé et al. | |
| 4,988,656 A | 1/1991 | Arzoumanidis et al. | |
| 4,990,479 A | 2/1991 | Ishimaru et al. | |
| 5,006,499 A | 4/1991 | Daire | |
| 5,013,702 A | 5/1991 | Arzoumanidis et al. | |

(Continued)

FOREIGN PATENT DOCUMENTS

| | | |
|---|---|---|
| DE | 2 153 520 | 5/1972 |
| DE | 2 553 104 | 6/1977 |
| EP | 0 350 170 | 3/1994 |
| EP | 0 607 703 | 7/1994 |
| EP | 0 669 347 | 8/1995 |

(Continued)

OTHER PUBLICATIONS

Wen et al. "Mechanics of Fluidization" *Chemical Engineering Progress Symposium Series*, 1962, vol. 62, 100-111.

(Continued)

*Primary Examiner*—J. A. Lorengo
*Assistant Examiner*—Jennine Brown
(74) *Attorney, Agent, or Firm*—Meyertons, Hood, Kivlin, Kowert & Goetzel, P.C.; Eric B. Meyertons

(57) ABSTRACT

The present invention relates to a catalyst for homo-polymerization or co-polymerization of ethylene, or more particularly to a solid complex titanium catalyst for homo-polymerization or co-polymerization of ethylene. The catalyst may be produced by preparing a magnesium solution by contact-reacting a magnesium halide compound with an alcohol. Reacting the solution with an ester compound and a boron compound. Then reacting the solution with a mixture of a titanium compound and a silicon compound.

23 Claims, No Drawings

U.S. PATENT DOCUMENTS

| | | | |
|---|---|---|---|
| 5,021,382 A | 6/1991 | Malpass, Jr. | |
| 5,059,570 A | 10/1991 | Bailly et al. | |
| 5,061,667 A | 10/1991 | Murata et al. | |
| 5,064,798 A | 11/1991 | Chang | |
| 5,081,090 A | 1/1992 | Arzoumanidis et al. | |
| 5,106,807 A | 4/1992 | Morini et al. | |
| 5,124,297 A | 6/1992 | Arzoumanidis et al. | |
| 5,130,284 A | 7/1992 | Terano et al. | |
| 5,134,104 A | 7/1992 | Sasaki et al. | |
| 5,175,332 A | 12/1992 | Chatterton et al. | |
| 5,182,245 A | 1/1993 | Arzoumanidis et al. | |
| 5,218,052 A | 6/1993 | Cohen et al. | |
| 5,244,996 A | 9/1993 | Kawasaki et al. | |
| 5,346,872 A | 9/1994 | Menon et al. | |
| 5,419,116 A | 5/1995 | Rast et al. | |
| 5,438,110 A | 8/1995 | Ishimaru et al. | |
| 5,439,995 A | 8/1995 | Bailly et al. | |
| 5,455,316 A | 10/1995 | Tsutsui et al. | |
| 5,459,116 A | 10/1995 | Ro et al. | |
| 5,498,770 A | 3/1996 | Hosaka et al. | |
| 5,502,128 A | 3/1996 | Flores et al. | |
| 5,585,317 A | 12/1996 | Sacchetti et al. | |
| 5,587,440 A | 12/1996 | Ehlers et al. | |
| 5,618,886 A | 4/1997 | Shinozaki et al. | |
| 5,629,390 A | 5/1997 | Nishimura et al. | |
| 5,696,044 A | 12/1997 | Zakharov et al. | |
| 5,726,261 A | 3/1998 | Sacchetti et al. | |
| 5,780,378 A | 7/1998 | Toida et al. | |
| 5,798,424 A | 8/1998 | Kong et al. | |
| 5,844,046 A | 12/1998 | Ohgizawa et al. | |
| 5,849,654 A | 12/1998 | Fushimi et al. | |
| 5,877,265 A | 3/1999 | Toida et al. | |
| 5,948,872 A | 9/1999 | Kioka et al. | |
| 5,965,478 A | 10/1999 | Goto et al. | |
| 5,968,862 A | 10/1999 | Abbott et al. | |
| 6,028,149 A * | 2/2000 | Luciani et al. | 526/119 |
| 6,034,025 A | 3/2000 | Yang et al. | |
| 6,066,702 A | 5/2000 | Ro et al. | |
| 6,111,038 A | 8/2000 | Kioka et al. | |
| 6,114,276 A | 9/2000 | Kong et al. | |
| 6,214,759 B1 | 4/2001 | Chang et al. | |
| 6,218,331 B1 | 4/2001 | DeMaio et al. | |
| 6,235,854 B1* | 5/2001 | Kioka et al. | 526/119 |
| 6,291,385 B1 | 9/2001 | Lee et al. | |
| 6,323,150 B1 | 11/2001 | Kojoh et al. | |
| 6,353,079 B1* | 3/2002 | Walker et al. | 528/87 |
| 6,482,764 B1 | 11/2002 | Chang et al. | |
| 6,521,560 B1 | 2/2003 | Kojoh et al. | |
| 6,537,942 B1 | 3/2003 | Shinozaki et al. | |
| 6,559,249 B1 | 5/2003 | Yang et al. | |
| 6,559,250 B1* | 5/2003 | Ro et al. | 526/124.3 |
| 6,613,849 B1* | 9/2003 | Walker et al. | 525/531 |
| 6,762,145 B1 | 7/2004 | Yang et al. | |
| 6,800,580 B1 | 10/2004 | Yang et al. | |
| 6,803,427 B1 | 10/2004 | Yang et al. | |
| 6,831,033 B1* | 12/2004 | Yang et al. | 502/118 |
| 6,855,663 B1 | 2/2005 | Yang | |
| 6,884,746 B1 | 4/2005 | Ko et al. | |
| 6,897,274 B1 | 5/2005 | Kim et al. | |
| 6,914,028 B1 | 7/2005 | Yang et al. | |
| 6,916,759 B1 | 7/2005 | Yang et al. | |
| 2004/0033888 A1 | 2/2004 | Yang et al. | |
| 2004/0063862 A1 | 4/2004 | Koo et al. | |

FOREIGN PATENT DOCUMENTS

| | | |
|---|---|---|
| EP | 0 606 125 | 5/1997 |
| EP | 0 602 922 | 1/1998 |
| JP | 51136625 | 11/1976 |
| JP | 58083006 | 5/1983 |
| JP | 59-145206 | 8/1984 |
| JP | 59145206 | 8/1984 |
| JP | 59-064602 | 12/1984 |
| JP | 61055103 | 3/1986 |
| JP | 61268704 | 11/1986 |
| JP | 62081405 | 4/1987 |
| JP | 63054004 | 3/1988 |
| JP | 63191811 | 8/1988 |
| JP | 63199703 | 8/1988 |
| JP | 63308003 | 12/1988 |
| JP | 02-300206 | 12/1990 |
| JP | 06340711 | 12/1994 |
| JP | 07-242706 | 9/1995 |
| KR | 9202488 | 1/1990 |
| KR | 9300665 | 9/1990 |
| WO | WO 9844009 | 10/1998 |
| WO | 00/73355 | 12/2000 |
| WO | 01/32718 | 5/2001 |

OTHER PUBLICATIONS

Aberbuj et al. "Stereoregular Polymerization of α-Olefins Catalyzed by Chiral Group 4 Benzamidinate Complexes of C1 and C3 Symmetry" *J. Am. Chem. Soc.*, 1998, vol. 120, 8640-8646.

Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623-2624.

Edelmann, "N-silylated benzamidines: versatile building blocks in main group and coordination chemistry," Coordination Chemistry Reviews, vol. 137, 1994, pp. 403-481.

Zhou et al., "Synthesis and Structure of Novel Bridged Dinuclear Indium Complexes," Inorg. Chem., 1996, vol. 35, pp. 1423-1424.

Zhou et al., "Bulky Amidinate Complexes of Tin(IV). Synthesis and Structure of Sn(RNC(R')NR)$_2$C2$_2$ (R= Cyclohexyl, R'=H, Me; R=SiMe$_3$, R'=$^t$Bu)," Inorg. Chem., 1997, vol. 36, pp. 501-504.

Linden et al., "Polymerization of □-Olefins and Butadiene and Catalytic Cyclotrimerization of 1-Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008-3021.

Stokes et al., "Reactions of Cobaloxime Anions and/or Hydrides with Enynes as a New, General Route to 1, 3- and 1,2-Dienylcobaloxime Complexes," Organometallics, 1996, vol. 15, pp. 2624-2632.

U.S. Appl. No. 11/046,130 entitled "Method for Preparing a Solid Titanium Catalyst for Olefin Polymerization" to Kim et al. filed Jan. 28, 2005.

* cited by examiner

US 7,045,478 B2

METHOD OF PRODUCING A CATALYST FOR ETHYLENE HOMO-AND CO-POLYMERIZATION

PRIORITY CLAIM

This application is a continuation of U.S. patent application Ser. No. 09/980,505 entitled "A CATALYST FOR HOMO- AND CO-POLYMERIZATION" filed on Mar. 29, 2002 now abandoned which is a 371 of PCT/KR99/00638, filed Oct. 23, 1999.

BACKGROUND OF THE INVENTION

1. Field of the Invention

The present invention relates to a catalyst for homo-polymerization or co-polymerization of ethylene, or more particularly to a good-activity titanium solid complex catalyst supported in a carrier containing magnesium, the catalyst being capable of producing polymers of high bulk density with a narrow particle distribution and low contents of fine particles.

2. Description of the Related Art

Catalysts containing magnesium for polymerization or co-polymerization of ethylene are known to have very good catalytic activities and to accord good bulk density, which are suitable for liquid-phase or gas-phase polymerization. By liquid phase polymerization of ethylene, it denotes the polymerization process performed in such medium of bulk ethylene, isopentane, or hexane, and as for the important characteristics of the catalyst used in the process, they are as follows: high activity, bulk density, the amount of molecules of low molecular weight dissolved in a medium, particle distribution of polymers, the amount of fine particles, and so on.

Many of the titanium-based catalysts containing magnesium for olefin polymerization, and the manufacturing methods thereof have been reported. Especially, many processes making use of magnesium solutions to obtain olefin polymerization catalysts of good bulk density have been known. There is a means of obtaining a magnesium solution by reacting magnesium compounds with such electron donors as alcohol, amine, cyclic ether, or organic carboxylic acid in the presence of a hydrocarbon solvent. As for the cases of use of alcohol, they are disclosed in U.S. Pat. Nos. 4,330, 649, and 5,106,807. Further, the methods for production of catalysts containing magnesium by reacting a magnesium solution with a halide compound such as titanium tetrachloride are well known. Such catalysts provide good bulk density, but there is much yet to be improved with respect to their catalytic activity and bulk density. Meanwhile, when the polymerization is carried out by means of using such catalysts, the resultant polymers have large amounts of fine powder with a broad particle size distribution and low bulk density. As such, there are serious defects with respect to productivity and handling at the time of processing.

To solve these problems, U.S. Pat. Nos. 3,953,414 and 4,111,835 disclosed a process for making catalysts for production of globular polymers with a very large average particle size by means of spray-drying magnesium dichloride hydrates. These processes, however, require much production facilities for catalysts such as spray-drying equipment and others, and the resultant catalysts have the disadvantages of low activities. Further, due to the existence of very large particles in polymers, there may arise problems at the time of the melting process.

SUMMARY OF THE INVENTION

As shown above, there is a need for the development of a new catalyst for homo-polymerization or co-polymerization of ethylene for producing polymers with the following conditions: simple manufacturing process, high polymerization activity, high bulk density for polymers by means of controlling the catalyst particles, and in particular narrow particle distribution with few fine particles. In the present invention, therefore, it is intended to provide a method for producing, from low-cost compounds via a simple process, a catalyst having an excellent catalytic activity, capable of producing polymers of high bulk density with narrow particle distribution and few fine particles. Further, the specific production process of catalysts and the steps thereof as disclosed in the present invention have never been reported in the prior art.

Consequently, the objective of the present invention is to provide a catalyst for homo-polymerization or co-polymerization of ethylene, said catalyst having good catalytic activity, capable of producing polymers of high bulk density, with narrow particle distribution and few fine particles.

Another objective of the present invention is to provide a simple process for producing a catalyst for homo-polymerization or co-polymerization of ethylene.

Still other objectives and the utility of the present invention will become apparent as references are made with respect to the following descriptions and the claims thereto.

DETAILED DESCRIPTION OF THE PREFERRED EMBODIMENTS

The catalyst of good catalytic activity, capable of producing polymers having narrow particle distribution and high bulk density with few fine particles as provided in the present invention, is produced by a simple yet efficient manufacturing process, which comprises (i) preparing a magnesium solution by contact-reacting a magnesium halide compound, with an alcohol, (ii) reacting the same with an ester compound containing at least one hydroxy group and a boron compound containing an alkoxy group, and (iii) producing a solid titanium catalyst by adding a titanium compound and a silicon compound.

Types of magnesium halide compounds used in the present invention are as follows: magnesium dihalides such as magnesium chloride, magnesium iodide, magnesium fluoride, and magnesium bromide; alkylmagnesium halides such as methylmagnesium halide, ethylmagnesium halide, propylmagnesium halide, butylmagnesium halide, isobutylmagnesium halide, hexylmagnesium halide, amylmagnesium halide, alkoxymagnesium halides such as methoxymagnesium halide, ethoxymagnesium halide, isopropoxymagnesium halide, butoxymagnesium halide, octoxymagnesium halide; and aryloxymagnesium halides such as phenoxymagnesium halide and methyl-phenoxymagnesium halide. Of the above magnesium compounds, two or more compounds can be used in a mixture. Further, the above magnesium compounds can be effectively used in the form of a complex compound with other metals.

Of the compounds listed above, some can be represented by a simple formula, but the others cannot be so represented depending on the production methods of magnesium compounds. In the latter cases, it can be generally regarded as a mixture of some of the listed compounds. For example, the following compounds can be used in the present invention: such compounds obtained by reacting magnesium compounds with polysiloxane compounds, silane compounds containing halogen, ester, or alcohol; and such compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having an alkyl group of 1~10 carbons; alkoxymagnesium chlorides, preferably those having 1~10 carbons; and aryloxymagnesium chlorides, preferably those having 6~20 carbons. The magnesium solution used in the present invention is made by dissolving the aforementioned compounds with alcohol as a solvent in the presence or absence of a hydrocarbon solvent.

As to the types of hydrocarbon solvents used in the present invention, they include aliphatic hydrocarbons such as pentane, hexane, heptane, octane, decane, and kerosene; alicyclic hydrocarbons such as cyclopentane, methycyclopentane, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a magnesium compound is converted into a magnesium solution, alcohol is used in the presence or absence of the aforementioned hydrocarbons. The types of alcohol include those containing 1~20 carbon atoms such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although alcohols containing 1~12 carbon atoms are preferable. The average size of a target catalyst and its particle distribution can vary according to the type of alcohol, the total contents, types of magnesium compounds, and the ratio of magnesium to alcohol, etc. Nevertheless, the total amount of alcohol required to obtain the magnesium solution is at least 0.5 mol per each mole of the magnesium compound, preferably about 1.0~20 mol, or more preferably about 2.0~10 mol.

The reaction of a magnesium compound with alcohol for producing magnesium solution is preferably carried out in the presence of hydrocarbon. The reaction temperature, while variable depending on the type and the amount of alcohol, is at least −25° C., preferably −10 ~200° C., or more preferably about 0~150° C. It is preferable to carry out the reaction for about 15 minutes ~5 hours, preferably for about 30 minutes ~4 hours.

Of the electron donors used in the present invention, the ester compounds containing at least one hydroxy group include unsaturated aliphatic acid esters having at least one hydroxy group such as, 2-hydroxy ethylacrylate, 2-hydroxy ethylmethacrylate, 2-hydroxypropyl acrylate, 2-hydrolxypropylmethacrylate, 4-hydroxy butylacrylate, pentaerithritol triacrylate; aliphatic monoesters or polyesters containing at least one hydroxy group such as 2-hydroxy ethyl acetate, methyl 3-hydroxy butylate, ethyl 3-hydroxy butylate, methyl 2-hydroxy isobutylate, ethyl 2-hydroxy isobutylate, methyl 3-hydroxy-2-methyl propionate, 2,2-dimethyl-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxy methyl)malonate; aromatic esters having at least one hydroxy group such as 2-hydroxy ethyl benzoate, 2-hydroxy ethyl salicylate, methyl-4-(hydroxy methyl)benzoate, methyl-4-hydroxy benzoate, ethyl-3-hydroxy benzoate, 4-methyl salicylate, ethyl salicylate, phenyl salicylate, propyl-4-hydroxy benzoate, phenyl-3-hydroxy naphthanoate, monoethylene glycol monobenzoate, diethylene glycol benzoate, triethylene glycol benzoate; alicyclic esters having at least one hydroxy group such as lactone, and others. The amount of the ester compound containing at least one hydroxy group should be 0.001~5 mol per mole of magnesium, or preferably 0.01~2 mol per mole of magnesium.

For the boron compound containing an alkoxy group, the other electron donor in the present invention, a compound having a general formula of $BR^1_n(OR^2)_{3-n}$ (here, $R^1$ represents a hydrocarbon having 1~20 carbons or a halogen element, $R^2$ for a hydrocarbon having 1~20 carbons, and n for an integer of 0~2) is preferable. More specifically, it includes trimethyl borate, triethyl borate, tributyl borate, triphenyl borate, methylboron diethoxide, ethylboron diethoxide, ethylboron dibutoxide, butylboron dibutoxide, phenylboron phenoxide, diethylboron ethoxide, dibutylboron ethoxide, diphenylboron phenoxide, diethoxyboron chloride, diethoxyboron bromide, diphenoxyboron chloride, ethoxyboron dichloride, ethoxyboron dibromide, butoxyboron dichloride, phenoxyboron dichloride, and ethylethoxyboron chloride. The amount of such compound should be 0.005 mol per mole of magnesium, or more preferably 0.05~2 mol per mole of magnesium.

As for the temperature for the contact-reaction of a magnesium solution, an ester compound containing at least one hydroxy group, and an alkoxy boron compound, the temperature of 0~100° C. is appropriate, or more preferably 10~70° C.

In the process, the catalyst particles are recrystallized by reacting the magnesium compound solution with a mixture of a liquid titanium compound of a general formula of $Ti(OR)_aX_{4-a}$ (R-stands for an alkyl group with 1~10 carbons; X for a halogen atom; and "a" for a natural number of 0 to 4) and a silicon compound of a general formula of $R_nSiCl_{4-n}$ (here R stands for hydrogen; or an alkyl, alkoxy, haloalkyl, or aryl group having 1 to 10 carbons; or a halosilyl or halosilyl alkyl group having 1 to 8 carbons; n=0–3). The types of titanium compounds which satisfy the general formula of $Ti(OR)_aX_{4-a}$ include titanium tetrahalide such as $TiCl_4$, $TiBr_4$, and $TiI_4$; alkoxy titanium trihalide such as $Ti(OCH_3)Cl_3$, $Ti(OC_2H_5)Cl_3$, $Ti(OC_2H_5)Br_3$, and $Ti(O(i-C_4H_9)Br_3$; alkoxy titanium dihalide compounds such as $Ti(OCH_5)_2Cl_2$, $Ti(OC_2H_5)_2Cl_2$, $Ti(O(i-C_4H_9)_2Cl_2$, and $Ti(OC_2H_5)_2Br_2$: and tetra-alkoxy titaniums such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

The types of silicon compounds satisfying the above general formula of $R_nSiCl_{4-n}$ include silicon tetrachloride; trichlorosilanes such as methyltrichlorosilane, ethyltrichlorosilane, phenyltrichlorosilane; dichlorosilanes such as dimethyldichlorosilane, diethyldichlorosilane, di-phenyldichlorosilane, and methylphenyldichlorosilane; monochlorosilanes such as trimethylchlorosilane; and a mixture of these silicon compounds can also be used in the present invention, or more preferably silicon tetrachloride can be used.

The amount of the mixture of a titanium compound and a silicon compound used during the re-crystallization of the magnesium compound solution is appropriately 0.1~200 mol per mole of the magnesium halide compound, preferably 0.1~100 mol, or more preferably 0.2~80 mol. The molar ratio of a titanium compound to a silicon compound in the mixture is appropriately 0.05~0.95, or more preferably 0.1~0.8. When the magnesium compound solution is reacted with the mixture of a titanium compound and a silicon compound, the shape and the size of the resultant re-crystallized solid constituents vary a great deal according to the reaction conditions. In order to obtain the target size of the catalyst and the size and distribution of the polymers, as intended by the present invention, it is advantageous to maintain the above mixture amounts for said titanium and silicon compounds, as well as their mix ratios. If it is outside of the above range, it will be difficult to obtain the results as intended. The reaction of the magnesium compound with the mixture of a titanium compound and a silicon compound should be carried out preferably at a sufficiently low temperature to result in formation of solid constituents. More preferably, the reaction should be carried out by contact-reaction at −70~ 70° C., or most preferably at −50~50° C. After the contact-reaction the reacting temperature is slowly raised for sufficient reaction for the duration of 0.5~5 hours at 50~150° C.

The particles of the solid catalysts obtained during the above process can be further reacted with titanium compounds. These titanium compounds are titanium halides, and alkoxy titanium halide with an alkoxy functional group of 1~20 carbons. At times, a mixture of these compounds can also be used. Of these compounds, however, titanium halide and an alkoxy titanium halide compound having an alkoxy functional group of 1~8 carbons can be appropriately used, or more preferably titanium tetrahalide can be used.

Further, the solid complex titanium catalysts produced during the process of the present invention can be utilized during homo-polymerization or co-polymerization of ethylene. In particular, the catalyst is used in homo-polymerization of ethylene, and also in co-polymerization of ethylene and α-olefin such as propylene, 1-butene, 1-pentene, 1-methyl-1-pentene, or 1-hexene having three or more carbons.

The polymerization reaction in the presence of the catalyst of the present invention is carried out by means of using (i) a solid complex titanium catalyst of the present invention, comprising magnesium, titanium, halogen, and electron donors, and (ii) a cocatalyst comprising, compounds of organic metals of Groups II and III of the Periodic Table.

The solid complex titanium catalyst constituents of the present invention can be used in pre-polymerization of ethylene or α-olefin prior to the use in the aforementioned polymerization reaction. The pre-polymerization can be carried out in the presence of a hydrocarbon solvent such as hexane, at a sufficiently low temperature, with ethylene or α-olefin under pressure, in the presence of the above catalyst constituents and such an organic aluminum compound as triethylaluminum. Pre-polymerization, by maintaining the shape of the catalyst by surrounding the catalyst particles with polymers, is helpful in producing food-quality post-polymerization shape of the polymers. The weight ratio of the polymers to the catalysts after pre-polymerization is ordinarily 0.1:1 to 20:1.

The organometallic compound in the present invention can be represented by a general formula of $MR_n$, wherein, M stands for a metal constituent of Group II or IIIA in the Periodic Table, such as magnesium, calcium, zinc, boron, aluminum, and gallium, R for an alkyl group with 1~20 carbons, such as a methyl, ethyl, butyl, hexyl, octyl, or decyl group, and n for the atomic value of the metal constituent. As for more preferable organometallic compounds, trialkyl aluminum having an alkyl group of 1~6 carbons, such as triethylaluminum and triisobutylaluminum, or the mixture thereof can be utilized. On occasions, an organic aluminum compound having one or more halogen or hydride groups, such as ethylaluminum dichloride, diethylaluminum chloride, ethyl-aluminum sesqui-chloride, or diisobutylaluminum hydride can also be used.

As for the polymerization reaction, it is possible to carry out either gas phase or bulk polymerization in the absence of an organic solvent, or liquid slurry polymerization in the presence of an organic solvent. These polymerization methods, however, are carried out in the absence of oxygen, water, or other compounds that may act as catalytic poison.

The concentration of the solid complex titanium compound (i) with respect to the polymerization system, in the case of a liquid phase slurry polymerization, is approximately 0.001~5 mmol in terms of the titanium atom of the catalyst per one liter of the solvent, or more preferably approximately 0.001~0.5 mmol. As for the solvent, the following compounds or the mixtures thereof can be used: alkanes or cycloalkanes such as pentane, hexane, heptane, n-octane, isooctane, cyclohexane, or methylcyclohexane; alkylaromatic such as toluene, xylene, ethylbenzene, isopropylbenzene, ethyltoluene, n-propylbenzene, or diethylbenzene; and halogenated aromatics such as chlorobenzene, chloronaphthalene, or ortho-dichlorobenzene.

In the case of gas phase polymerization, the amount of the solid complex titanium catalyst (i) should be approximately 0.001~5 mmol in terms of the titanium atom of the catalyst per one liter of the polymerization reactant, preferably approximately 0.001~1.0 mmol, or more preferably approximately 0.01~0.5 mmol.

The preferable concentration of the organometallic compound (ii) is about 1–2,000 mol, as calculated by the aluminum atoms, per mole of the titanium atoms in the catalyst (i), or more preferably about 5~500 mol.

To secure a good reaction rate of polymerization, the polymerization herein is carried out at a sufficiently good temperature, regardless of the polymerization manufacturing process. Generally, the temperature of approximately 20~200° C. is appropriate, or more preferably approximately 20~95° C. The appropriate pressure of monomers at the time of polymerization is the atmospheric to 100 atm, or more preferably 2~50 atm.

In the present invention, the changes in the molecular weight according to the amount of hydrogen at the time of polymerization are shown as a melt index (ASTM D 1238), the index generally known in the art. The value of the melt index generally becomes greater as the molecular weight decreases.

The products obtained by the method of polymerization of the present invention are solid ethylene homogeneous polymers or the copolymers of ethylene and α-olefin, which have excellent bulk density and fluidity. Since the polymer yields are sufficiently good, there is no need for the removal of the catalyst residues.

The present invention is further described by means of the examples and comparative examples as below but should not be confined or limited to these examples.

EXAMPLE 1

Production of Catalyst

A solid complex titanium catalyst was produced by means of the following three steps:
  (i) Step: Production of magnesium solution
    Into a 1.0 L reactor equipped with a mechanical stirrer, replaced with nitrogen atmosphere, 9.5 g of $MgCl_2$ and 400 ml of decane were placed therein. After they were stirred at 300 rpm, 60 ml of 2-ethyl hexanol was added thereto. The temperature was raised to 120° C., and then the reaction was allowed to continue for three hours. The homogenous solution, which was obtained after the reaction, was cooled to room temperature (25° C.).

(ii) Step: Contact-reaction of a magnesium solution, an ester containing a hydroxy group and an alkoxy boron compound To the magnesium solution, cooled to room temperature as above, 1.2 ml of 2-hydroxyethyl methacrylate and 5.1 ml of trimethyl borate were added, and then the reaction was allowed to continue for an hour.

(iii) Step: Treatment of a mixture of a titanium compound and a silicon compound Into the above solution, a solution mixture of 30 ml of titanium tetrachloride and 30 ml of silicon tetrachloride was dripped thereto for one hour at room temperature (25° C.). After the completion of the dripping process, the temperature of the reactor was raised to 80° C. while stirring, after which was maintained at that temperature for one hour. After stopping the stirring, the supernatant of the solution was removed, and to the remaining solid layer was added 300 ml of decane and 100 ml of titanium tetrachloride in sequence. There, the temperature was raised to 100° C. and maintained threat for two hours. After the reaction, the reactor was cooled to room temperature and the washing of the resulting solid product with 400 ml of hexane was repeated until the removal of free unreacted titanium chloride. The titanium content of the solid catalyst so produced was 3.8%.

Polymerization

A 2-L good-pressure reactor was dried in an oven and assembled while still hot. In order to make the inside of the reactor nitrogen atmosphere, nitrogen and vacuum were alternatively manipulated three times in the reactor. To the reactor was added 1,000 ml of n-hexane, after which 2 mmols of triethylaluminum and a solid catalyst by 0.03 mmol in terms of the titanium atoms were added thereto. Then, 500 ml of hydrogen was added. The temperature was raised to 80° C. while stirring at 700 rpm. The pressure of ethylene was adjusted to 80 psi, and the polymerization was allowed to continue for an hour. After the polymerization, the temperature of the reactor was lowered to room temperature, and a large amount of ethanol was added to stop the polymerization. The polymer thus produced was collected by separation and was dried in an oven at 50° C. for at least six hours, whereby polyethylene was obtained in the form of white powder.

The polymerization activity (kg of polyethylene divided by mmol of Ti) was calculated as the weight (kg) ratio of the polymer as produced per the amount of the catalysts so used (mmol of Ti). The results of the polymerization are shown in Table 1, together with the bulk density (g/ml) of the polymers, the melt index (g/10 minutes), and particle size distribution of the polymers.

EXAMPLE 2

In Step (ii) of Example 1, 1.2 ml of 2-hydroxyethyl methacrylate and 7.7 ml of trimethyl borate were used for the production of the catalyst. The titanium content of the catalyst thus produced was 3.4%. The polymerization was carried out as in Example 1, and the results thereof are shown in Table 1.

EXAMPLE 3

In Step (ii) of Example 1, 1.2 ml of 2-hydroxyethyl methacrylate and 7.6 ml of triethyl borate were used for the production of the catalyst. The titanium content of the catalyst thus produced was 3.5%. The polymerization was carried out as in Example 1, and the results thereof are shown in Table 1.

EXAMPLE 4

In Step (ii) of Example 1, 1.2 ml of 2-hydroxyethyl methacrylate and 11.4 ml of triethyl borate were used for the production of the catalyst. The titanium content of the catalyst thus produced was 3.4%. The polymerization was carried out as in Example 1, and the results thereof are shown in Table 1.

EXAMPLE 5

In Step (ii) of Example 1, 1.2 ml of 2-hydroxyethyl methacrylate and 12.1 ml of tributyl borate were used for the production of the catalyst. The titanium content of the catalyst thus produced was 3.9%. The polymerization was carried out as in Example 1, and the results thereof are shown in Table 1.

EXAMPLE 6

In Step (ii) of Example 1, 1.2 ml of 2-hydroxyethyl methacrylate and 18.2 ml of tributyl borate were used for the production of the catalyst. The titanium content of the catalyst thus produced was 3.5%. The polymerization was carried out as in Example 1, and the results thereof are shown in Table 1.

EXAMPLE 7

In Step (ii) of Example 1, 1.2 ml of 2-hydroxyethyl methacrylate and 11.4 ml of triethyl borate were used, and in Step (iii) 40 ml of titanium tetrachloride and 20 ml of silicon tetrachloride were used for the production of the catalyst. The titanium content of the catalyst thus produced was 4.0%. The polymerization was carried out as in Example 1, and the results thereof are shown in Table 1.

EXAMPLE 8

In Step (ii) of Example 1, 1.2 ml of 2-hydroxyethyl methacrylate and 11.4 ml of triethyl borate were used, and in Step (iii) 20 ml of titanium tetrachloride and 40 ml of silicon tetrachloride were used for the production of the catalyst. The titanium content of the catalyst thus produced was 3.3%. The polymerization was carried out as in Example 1, and the results thereof are shown in Table 1.

COMPARATIVE EXAMPLE 1

In Step (ii) of Example 1, the catalyst was produced without 2-hydroxyethyl methacrylate or trimethyl borate. The titanium content of the catalyst thus produced was 3.9%. The polymerization was carried out as in Example 1, and the results thereof are shown in Table 1.

COMPARATIVE EXAMPLE 2

In Step (ii) of Example 1, 1.2 ml of 2-hydroxyethyl methacrylate was used alone, without trimethyl borate, for the production of the catalyst. The titanium content of the catalyst thus produced was 3.3%. The polymerization was carried out as in Example 1, and the results thereof are shown in Table 1.

COMPARATIVE EXAMPLE 3

In Step (ii) of Example 1, neither 2-hydroxyethyl methacrylate nor trimethyl borate was used, and in Step (iii) 60 ml of titanium tetrachloride was used for the production of the catalyst. The titanium content of the catalyst thus produced was 4.1%. The polymerization was carried out as in Example 1, and the results thereof are shown in Table 1.

COMPARATIVE EXAMPLE 4

In Step (ii) of Example 1, 1.2 ml of 2-hydroxyethyl methacrylate and 12.1 ml of tributyl borate were used, and in Step (iii) 60 ml of titanium tetrachloride was used for the production of the catalyst. The titanium content of the catalyst thus produced was 3.7%. The polymerization was carried out as in Example 1, and the results thereof are shown in Table 1.

TABLE 1

| | | | | Results of Polymerization | | | | | | | |
|---|---|---|---|---|---|---|---|---|---|---|---|
| | Activity (kgPE/ | Bulk density | Melt Index | | | Distribution of Polymer Particles (wt %) | | | | | |
| Example | mmol Ti) | (g/ml) | (g/10 min) | >1100 μm | 840 μm | 500 μm | 250 μm | 177 μm | 105 μm | 74 μm | <44 μm |
| 1 | 5.4 | 0.38 | 0.52 | 0.6 | 3.4 | 10.8 | 52.4 | 21.2 | 8.4 | 2.6 | 0.6 |
| 2 | 4.8 | 0.36 | 0.43 | 0.4 | 9.4 | 16.4 | 45.2 | 18.7 | 6.7 | 3.2 | 0 |
| 3 | 6.3 | 0.40 | 0.58 | 0.2 | 1.2 | 12.6 | 58.2 | 24.8 | 2.6 | 0.4 | 0 |
| 4 | 5.9 | 0.38 | 0.42 | 0.3 | 4.6 | 9.3 | 54.8 | 19.8 | 6.7 | 4.5 | 0 |
| 5 | 6.4 | 0.37 | 0.54 | 0.8 | 4.6 | 8.6 | 59.4 | 18.6 | 7.1 | 0.9 | 0 |
| 6 | 5.4 | 0.36 | 0.52 | 0.5 | 4.1 | 10.5 | 52.8 | 20.2 | 11.7 | 0.7 | 0 |
| 7 | 6.2 | 0.35 | 0.54 | 0.2 | 0.7 | 16.4 | 41.4 | 36.8 | 1.2 | 2.1 | 1.2 |
| 8 | 6.0 | 0.35 | 0.52 | 1.2 | 12.1 | 26.2 | 38.4 | 19.4 | 1.5 | 0.4 | 0.8 |
| CE 1 | 3.8 | 0.29 | 0.31 | 0 | 0.6 | 0.5 | 7.6 | 13.9 | 24.2 | 36.2 | 17.0 |
| CE 2 | 4.4 | 0.26 | 0.42 | 2.2 | 2.7 | 2.2 | 9.4 | 13.7 | 12.6 | 34.2 | 22.8 |
| CE 3 | 3.9 | 0.22 | 0.36 | 1.6 | 0.4 | 1.2 | 8.6 | 15.5 | 38.7 | 19.4 | 14.6 |
| CE 4 | 3.6 | 0.28 | 0.31 | 0.7 | 3.8 | 5.1 | 16.2 | 32.4 | 22.1 | 15.5 | 4.2 |

*CE: Comparative Examples

As shown above, the production process of the catalyst of the present invention for homo-polymerization and co-polymerization of ethylene is simple with excellent catalytic activity. Further, the polymers so produced have high bulk density and narrow particle distribution in addition to having the effect of reducing the amount of fine particles.

The invention claimed is:

1. A method of producing a solid titanium catalyst for homo-polymerization and co-polymerization of ethylene comprising:
   preparing a magnesium compound solution by contacting a magnesium halide compound with an alcohol;
   preparing a second solution by reacting the magnesium compound solution with an ester compound comprising at least one hydroxy group and a boron compound comprising at least one alkoxy group; and
   reacting the second solution with a mixture of a titanium compound and a silicon compound to produce the solid titanium catalyst.

2. The method of claim 1, wherein the produced solid titanium catalyst is further reacted with a second titanium compound.

3. The method of claim 1, wherein the ester compound comprises an unsaturated aliphatic ester having at least one hydroxy group.

4. The method of claim 1, wherein the ester compound comprises 2-hydroxy ethylacrylate, 2-hydroxy ethylmethacrylate, 2-hydroxy propyl acrylate, 2-hydroxy propylmethacrylate, 4-hydroxy butylacrylate, or pentaerithritol triacrylate.

5. The method of claim 1, wherein the ester compound comprises an aliphatic monoester having at least one hydroxy group or an aliphatic polyester having at least one hydroxy group.

6. The method of claim 1, wherein the ester compound comprises 2-hydroxy ethyl acetate, methyl 3-hydroxy butylate, ethyl 3-hydroxy butylate, methyl 2-hydroxy isobutylate, ethyl 2-hydroxy isobutylate, methyl 3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyllactate, isopropyl lactate, butyl-isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, or diethyl bis-(hydroxymethyl) malonate.

7. The method of claim 1, wherein the ester compound comprises an aromatic ester having at least one hydroxy group.

8. The method of claim 1, wherein the ester compound comprises 2-hydroxy ethyl benzoate, 2-hydroxy ethyl salicylate, methyl-4-(hydroxy methyl) benzoate, methyl-4-hydroxy benzoate, ethyl-3-hydroxy benzoate, 4-methyl salicylate, ethyl salicylate, phenyl salicylate, propy-4-hydroxy benzoate, phenyl-3-hydroxy naphthanoate, monoethylene glycol monobenzoate, diethylene glycol benzoate, or triethylene glycol monobenzoate.

9. The method of claim 1, wherein the ester compound comprises an alicyclic ester having at least one hydroxy group.

10. The method of claim 1, wherein the boron compound comprises the general formula $BR^1{}_n(OR^2)_{3-n}$, wherein $R^1$ comprises a hydrocarbon having between 1 to 20 carbons or a halogen element, wherein $R^2$ comprises a hydrocarbon having between 1 to 20 carbons, and wherein n comprises an integer between 0 and 2.

11. The method of claim 1, wherein the boron compound comprises trimethyl borate, triethyl borate, tributyl borate, triphenyl borate, methylboron diethoxide, ethylboron diethoxide, ethylboron dibutoxide, butylboron dibutoxide, phenylboron diphenoxide, diethylboron ethoxide, dibutylboron ethoxide, diphenylboron phenoxide, diethoxyboron chloride, diethoxyboron bromide, diphenoxyboron chloride, ethoxyboron dichloride, ethoxyboron dibromide, butoxyboron dichloride, phenoxyboron dichloride, or ethylethoxyboron chloride.

12. The method of claim 1, wherein the titanium compound comprises the general formula $Ti(OR)_aX_{4-a}$, wherein R comprises an alkyl group with 1 to 20 carbon atoms, wherein X comprises a halogen atom, and wherein a comprises an integer between 0 and 4.

13. The method of claim 1, wherein the titanium compound comprises a titanium tetrahalide, wherein the titanium tetrahalide comprises $TiCl_4$, $TiBr_4$, or $TiI_4$.

14. The method of claim 1, wherein the titanium compound comprises an alkoxy-titanium trihalide, wherein the alkoxy-titanium trihalide comprises $Ti(OCH_3)Cl_3$, $Ti(OC_2H_5)Cl_3$, $Ti(OC_2H_5)Br_3$, or $Ti(O(i-C_4H_9))Br_3$.

15. The method of claim 1, wherein the titanium compound comprises an alkoxy-titanium dihalide, wherein the alkoxy-titanium dihalide comprises $Ti(OCH_3)_2Cl_2$, $Ti(OC_2H_5)_2Cl_2$, $Ti(OC_2H_5)_2Br_2$, or $Ti(O(i-C_4H_9))_2Cl_2$.

16. The method of claim 1, wherein the titanium compound comprises a tetraalkoxy-titanium compound, wherein the tetraalkoxy-titanium compound comprises $Ti(OCH_3)_4$, $Ti(OC_2H_5)_4$, or $Ti(OC_4H_9)_4$.

17. The method of claim 1, wherein the silicon compound comprises the general formula $R_nSiCl_{4-n}$, wherein R comprises hydrogen, or R comprises an alkyl group, an alkoxy group, a haloalkyl group, or an aryl group having 1 to 10 carbon atoms, or R comprises a halosilyl group or a halosilyl alkyl group having 1 to 8 carbon atoms, and wherein n comprises an integer between 0 and 4.

18. The method of claim 1, wherein the silicon compound comprises silicon tetrachloride.

19. The method of claim 1, wherein the silicon compound comprises a trichlorosilane, wherein the trichlorosilane comprises methyltrichlorosilane, ethyltrichlorosilane, or phenyltrichlorosilane.

20. The method of claim 1, wherein the silicon compound comprises a dichlorosilane, wherein the dichlorosilane comprises dimethyldichlorosilane, diethyldichlorosilane, diphenyldichlorosilane, or methylphenyldichlorosilane.

21. The method of claim 1, wherein the silicon compound comprises trimethylchlorosilane.

22. The method of claim 1, wherein the ester compound comprises 2-hydroxyethyl methacrylate, wherein the boron compound comprises trimethyl borate, wherein the titanium compound comprises titanium tetrachloride, and wherein the silicon compound comprises silicon tetrachloride.

23. The method of claim 1, wherein an amount of the mixture of the titanium compound and the silicon compound is between about 0.1 mol per mole of the magnesium halide compound and about 200 mol per mole of the magnesium halide compound, and wherein the molar ratio of the titanium compound to the silicon compound in the mixture is between about 0.05 and about 0.95.

* * * * *